(12) United States Patent
Dotschkal et al.

(10) Patent No.: US 10,539,417 B2
(45) Date of Patent: Jan. 21, 2020

(54) METHOD AND DEVICE FOR DETERMINING DIMENSIONAL PROPERTIES OF A MEASUREMENT OBJECT

(71) Applicant: Carl Zeiss Industrielle Messtechnik GmbH, Oberkochen (DE)

(72) Inventors: Florian Dotschkal, Aalen (DE); Günter Haas, Aalen (DE); Josef Wanner, Oberkochen (DE); Florian Mayer, Backnang (DE); Tobias Schramm, Eschach (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 215 days.

(21) Appl. No.: 15/712,379

(22) Filed: Sep. 22, 2017

(65) Prior Publication Data
US 2018/0010910 A1    Jan. 11, 2018

Related U.S. Application Data

(63) Continuation of application No. PCT/EP2015/056613, filed on Mar. 26, 2015.

(51) Int. Cl.
*G01B 21/04* (2006.01)
*G05B 19/4093* (2006.01)

(52) U.S. Cl.
CPC ..... *G01B 21/047* (2013.01); *G05B 19/40932* (2013.01); *G05B 19/40935* (2013.01)

(58) Field of Classification Search
CPC .... G01B 5/008; G01B 21/045; G01B 11/005; G01B 21/042; G01B 21/047; G01B 21/04;
(Continued)

(56) References Cited

U.S. PATENT DOCUMENTS 5,596,744 A * 1/1997 Dao ............... G06F 16/256
5,953,687 A * 9/1999 Zink .............. G01B 21/04
33/503
(Continued)

FOREIGN PATENT DOCUMENTS

CN        85106054 A      4/1987
CN        85107031 A      4/1987
(Continued)

OTHER PUBLICATIONS

English translation of International Preliminary Report on Patentability (Chapter II) for PCT/EP2015/056613; dated Sep. 28, 2017; 16 pp.
(Continued)

*Primary Examiner* — Yaritza Guadalupe-McCall
(74) *Attorney, Agent, or Firm* — Harness, Dickey & Pierce, P.L.C.

(57) ABSTRACT

A computer-assisted method for determining dimensional properties of a measurement object using a coordinate measuring machine. An image representation of the measurement object is shown to a user and the user selects a first geometric element of the measurement object, resulting in the display of eligible test features for the selected first geometric element. The eligible test features are automatically determined from a plurality of typical test features stored in a database, by the selected first geometric element being assigned to one of a plurality of predefined measurement elements stored in the database. A defined measurement sequence is generated in a computer-assisted manner based on the test feature selected by the user. Individual measured values are recorded on the first geometric element using the defined measurement sequence. A numerical value based on the individual measured values is determined,
(Continued)

which represents a dimensional property of the first geometric element corresponding to the selected test feature.

19 Claims, 4 Drawing Sheets

(58) Field of Classification Search
CPC ...... G01B 5/012; G01B 7/012; G01B 11/002; G01B 11/007; G01B 11/24; G01B 11/03
USPC .................................................. 33/503, 340
See application file for complete search history.

(56) References Cited

U.S. PATENT DOCUMENTS

| | | | |
|---|---|---|---|
| 7,064,845 | B2 | 6/2006 | Christoph |
| 10,309,765 | B2* | 6/2019 | Seitz ................... G06T 7/70 |
| 2006/0047457 | A1* | 3/2006 | Agapiou ............. G01B 21/04 702/94 |
| 2010/0060903 | A1 | 3/2010 | Nakatsukasa et al. |
| 2010/0138028 | A1 | 6/2010 | Tasker et al. |
| 2010/0268355 | A1 | 10/2010 | Chang et al. |
| 2012/0027307 | A1 | 2/2012 | Naruse |
| 2014/0152805 | A1 | 6/2014 | Saeki et al. |
| 2016/0334778 | A1* | 11/2016 | Cope ................. G05B 19/401 |
| 2017/0090742 | A1* | 3/2017 | Ade ..................... G01B 5/012 |
| 2017/0248407 | A1* | 8/2017 | Dotschkal ......... G01B 21/047 |
| 2018/0010910 | A1* | 1/2018 | Dotschkal ......... G01B 21/047 |
| 2018/0045511 | A1* | 2/2018 | Georgi ............... G01B 21/04 |
| 2018/0350132 | A1* | 12/2018 | Paulson ............... G06T 15/10 |

FOREIGN PATENT DOCUMENTS

| | | | |
|---|---|---|---|
| CN | 1643339 | A | 7/2005 |
| CN | 101023322 | A | 8/2007 |
| CN | 101387494 | A | 3/2009 |
| CN | 101672630 | A | 3/2010 |
| CN | 101871775 | A | 10/2010 |
| CN | 101842188 | B | 12/2013 |
| EP | 1189124 | B1 | 6/2004 |
| EP | 2738515 | A1 | 6/2014 |
| EP | 2801876 | A1 | 11/2014 |
| EP | 2801876 | A1 | 11/2014 |
| JP | H02108910 | A | 4/1990 |
| JP | 2963419 | B2 | 10/1999 |
| JP | 2000266534 | A | 9/2000 |
| JP | 2010281621 | A | 12/2010 |
| JP | 2012032224 | A | 2/2012 |
| WO | WO 02/25207 | A1 | 3/2002 |
| WO | WO 03/044452 | A2 | 5/2003 |

OTHER PUBLICATIONS

International Search Report for PCT/EP2015/056613; dated May 2015; 2 pp.

Brochure "Einfach Messen und was Sie dazu wissen sollten—Ein Fibel der Messtechnik;" 61212-2400101; exact date unknown, but at least prior to Mar. 2015; 7 pages.

Keyence America "Easy Operation for Everyone"; exact date unknown, but at least prior to Mar. 2015; 3 pp.

Chinese Search Report (English language translation included) for Application No. 201580078328.8; dated Jan. 21, 2019; 6 pp.

Fang Yixiang et al.; Development of technology for recognizing and extracting inspection information in intelligent coordinate measurement; Journal of Hebei University of Science and Technology; vol. 34, No. 2; Apr. 2013; pp. 134-142.

Chen Xiulong et al.; Research on novel parallel robot coordinate measuring machine simulation modeling; Optics and Precision Engineering; vol. 14, No. 6; Dec. 2006; pp. 1025-1031.

* cited by examiner

METHOD AND DEVICE FOR DETERMINING DIMENSIONAL PROPERTIES OF A MEASUREMENT OBJECT

CROSS-REFERENCE TO RELATED APPLICATION

This application is a continuation of international patent application PCT/EP2015/056613, filed on Mar. 26, 2015 designating the U.S. The entire content of this prior application is incorporated herein by reference.

BACKGROUND OF THE INVENTION

The present invention relates to methods and a device for determining dimensional properties of a measurement object having a plurality of geometric elements.

EP 2 738 515 A1 discloses a typical example of such a device in the form of a coordinate measuring machine. The coordinate measuring machine has a workpiece receptacle and a CCD camera, which is movable in three orthogonal spatial directions relative to the workpiece receptacle. The CCD camera is part of a measuring head that can be used to determine the position of selected measurement points on a measurement object relative to a reference coordinate system. Usually, such a device is used to determine measurement point coordinates for a plurality of measurement points on a measurement object. On the basis of said measurement point coordinates, it is then possible to determine dimensional properties of the measurement object, such as, for instance, the diameter of a bore or the distance between two edges on the measurement object.

In principle, it is possible to manually control the movements of the measuring head relative to the measurement object and the recording of the measured values. However, an automated measurement sequence is desirable in quality control of industrially produced products, such that a plurality of measurement objects of identical type can be measured rapidly and as reproducibly as possible. Creating an automated measurement sequence requires fundamental knowledge of the functioning of coordinate measuring machines and experience of how different geometric elements on a measurement object can best be measured. Furthermore, an optimum measurement sequence may vary depending on what kind of measuring head and/or what movement axes are available on a coordinate measuring machine. In this regard, a measuring head having a non-contact sensor, as in the case of the coordinate measuring machine from EP 2 738 515 A1, for instance, may require a different measurement sequence than, for example, a tactile measuring head, i.e. a measuring head having a probe element configured to touch selected measurement points on the measurement object.

EP 2 738 515 A1 proposes to use a wide-angle monitoring camera in addition to the CCD camera on the measuring head. The wide-angle monitoring camera is configured to record an image of the entire measurement object from a bird's eye perspective. This (further) image is shown on the display of an operator terminal in order to make it easier for the operator to generate an automated measurement sequence taking into account and avoiding possible collisions between the measuring head and the measurement object. However, the device from EP 2 738 515 A1 does not offer more extensive support in the generation of a measurement sequence and the operator thus requires profound knowledge and experience in order to generate an optimum measurement sequence for a specific measurement object.

Under the brand name CALYPSO, the assignee of the present invention (Carl Zeiss Industrielle Messtechnik GmbH) offers software for generating an automatic measurement sequence and for processing the measurement results obtained. The basic principles of CALYPSO are described for example in a brochure entitled "Einfach Messen and was Sie dazu wissen sollten—Eine Fibel der Messtechnik" ["Straightforward measurement and what you should know to implement it—Primer for metrology"] (order number from Carl Zeiss: 61212-2400101). The measurement sequence is generated by CALYPSO on the basis of so-called test features. A test feature represents a dimensional property of a defined geometric element (measurement element) on a measurement object such as, for instance, the diameter of a bore, the roundness of a cylinder section or the position of such a geometric element relative to the reference coordinate system. In order to quantify a test feature with respect to a geometric element, it is generally necessary to detect a plurality of measurement points on the geometric element, such that the quantification of a test feature may require the recording of a plurality of individual measured values. With the selection of a test feature, CALYPSO generates control commands that can be used to automatically control the measuring head for measuring the associated measurement points. By using test features as a basis, CALYPSO makes it easier for an operator to generate the measurement sequence, because the test features generally correspond to information which the operator can infer from a technical drawing of the measurement object. Furthermore, CALYPSO is able to automatically identify geometric elements having defined standard geometries, such as, for instance, circle, cylinder, rectangle, straight line, etc., if the corresponding measurement point coordinates of the geometric element are available for evaluation.

In order to generate an automatic measurement sequence, however, the operator has to identify and define all the test features on the measurement object beforehand, that is to say that generating the measurement sequence begins "at the desk" with the identification and definition of all required test features. Afterward, the operator has to assign all the geometric elements on the measurement object to the previously selected test features. The operator then performs—by manual control—all the measuring steps, one after the other, that the machine is intended to perform later in an automated manner. Even though CALYPSO already facilitates the generation of an automatic measurement sequence in this way, the operator must still have considerable technical knowledge and experience in order to generate a meaningful measurement sequence. The operator's knowledge and experience must include, in particular, the individual functioning of the coordinate measuring machine used in order to obtain a measurement sequence which yields all measured values with the desired accuracy as efficiently as possible.

Under the designation "Model Series IM", Keyence Corporation offers a measuring system in which measurement sequences are generated by means of a symbol menu. Here, too, the operator firstly selects general test features from a symbol menu. Afterward, in a further step, the operator selects measurement elements at which the previously selected test features are intended to be determined. The measured values are recorded on the basis of silhouette images of the measurement object. Even though the selection of test features on the basis of offered symbols for general test features is very convenient for the operator, this known system, too, requires considerable knowledge and experience of the relationship between individual measurement elements on a measurement object and the test features of interest.

SUMMARY OF THE INVENTION

Against this background, it is an object of the present invention to provide a method and a device which make it possible to determine dimensional properties of an individual measurement object in a simple and rapid manner.

It is another object to provide a method and a device which make it possible to determine dimensional properties of an individual measurement object with an accuracy that is optimized taking into account the available sensor and machine tolerances of the measuring device.

It is yet another object to provide a convenient method for programming an individual measurement sequence on a coordinate measuring machine.

In accordance with a first aspect of the invention, there is provided a computer-assisted method for determining dimensional properties of a measurement object having a plurality of geometric elements, the method comprising the steps of providing a coordinate measuring machine having a measuring head for recording measured values representing a position of at least one measurement point on the measurement object, providing a database containing a plurality of predefined measurement elements and a plurality of typical test features assigned to the predefined measurement elements, wherein each typical test feature from the plurality of typical test features represents a defined dimensional property of at least one predefined measurement element, providing an image representation of the measurement object to a user, which image representation shows at least a first and a second geometric element from the plurality of geometric elements, receiving first user input from the user, said first user input selecting the first geometric element in the image representation, graphically displaying eligible test features for the selected first geometric element in the image representation when the first user input is received, wherein the eligible test features are automatically determined from the plurality of typical test features by the selected first geometric element being assigned to a predefined measurement element from the plurality of predefined measurement elements, and wherein displaying the eligible test features for the selected first geometric element may vary in response to further user input, receiving second user input from the user, said second user input selecting at least one displayed eligible test feature for the first geometric element in the image representation, wherein the at least one displayed eligible test feature becomes, as a result of the selection by the second user input, a selected test feature for the first geometric element, generating a defined measurement sequence depending on the selected test feature in a computer-assisted manner, recording individual measured values on the first geometric element with the aid of the measuring head and depending on the defined measurement sequence, and determining a numerical value depending on the individual measured values, wherein the numerical value represents a dimensional property of the first geometric element which corresponds to the selected test feature.

In accordance with another aspect of the invention, there is provided a device for determining dimensional properties of a measurement object having a plurality of geometric elements, comprising a workpiece receptacle for holding the measurement object, comprising a measuring head movable relative to the workpiece receptacle and configured for recording measured values representing a position of at least one measurement point on the measurement object, comprising an evaluation and control unit, which is configured to move the measuring head relative to the workpiece receptacle depending on a defined measurement sequence, and comprising an image display appliance, wherein the evaluation and control unit has a database containing a plurality of predefined measurement elements and a plurality of typical test features with respect to the predefined measurement elements, wherein each typical test feature from the plurality of typical test features represents a defined dimensional property of at least one predefined measurement element, wherein the evaluation and control unit is configured to display an image representation of the measurement object, which image representation shows at least a first and a second geometric element from the plurality of geometric elements, on the image display appliance, wherein the evaluation and control unit provides a first selection tool in order to enable user selection of the geometric elements on the basis of the image representation and user selection of test features, wherein the evaluation and control unit is further configured to generate a defined measurement sequence depending on the selected test features, wherein the first selection tool enables deliberate selection of individual geometric elements in the image representation of the measurement object by a user, wherein the evaluation and control unit is further configured to graphically display eligible test features for the first geometric element in the image representation of the measurement object when the user selects the first geometric element, wherein the evaluation and control unit determines the eligible test features depending on the selection from the plurality of typical test features in the database by virtue of the fact that said evaluation and control unit assigns the selected first geometric element to a predefined measurement element from the plurality of predefined measurement elements, wherein any display of the test features offered for further selection changes depending on the current selection if the operator selects a different geometric element or further geometric elements, wherein the evaluation and control unit further provides a second selection tool in order to enable selection of at least one displayed eligible test feature by the user in the image representation, wherein the at least one displayed eligible test feature becomes, as a result of the selection, a selected test feature, and wherein the evaluation and control unit is further configured, depending on the selected test feature, to record individual measured values on the first geometric element and to determine a numerical value representing a dimensional property of the first geometric element which corresponds to the selected test feature.

In accordance with yet another aspect of the invention, there is provided a method for determining dimensional properties of a measurement object having a plurality of geometric elements, comprising the steps of providing a coordinate measuring machine having a measuring head for recording measured values representing a position of at least one measurement point on the measurement object, providing a database containing a plurality of predefined measurement elements and a plurality of typical test features with respect to the predefined measurement elements, wherein each typical test feature from the plurality of typical test features represents a defined dimensional property of at least one predefined measurement element, providing an image representation of the measurement object, which image representation shows at least a first and a second geometric element from the plurality of geometric elements, selecting the first geometric element using the image representation, displaying eligible test features for the selected first geometric element, wherein the eligible test features are determined from the plurality of typical test features by the selected first geometric element being assigned to a predefined measurement element from the plurality of predefined measurement elements, selecting at least one displayed eligible test feature, wherein the at least one displayed eligible test feature becomes, as a result of the selection, a selected test feature for the first geometric element, generating a defined measurement sequence depending on the selected test feature in a computer-assisted manner, recording individual measured values on the first geometric element with the aid of the measuring head and depending on the defined measurement sequence, and determining a numerical value depending on the individual measured values, wherein the numerical value represents a dimensional property of the first geometric element which corresponds to the selected test feature.

It is particularly advantageous if the method and the device according to the aforementioned aspects are realized with the aid of a computer program comprising program code configured to perform the abovementioned method steps when the program code is executed on a coordinate measuring machine.

The novel methods and the corresponding device use a database in which typical test features for a plurality of predefined measurement elements are stored. The typical test features in the database are independent of specific geometric elements of an individual measurement object which is intended to be measured by means of the novel method and the novel device. In other words, the typical test features are stored in the database as generic test features that are related to general, mathematically defined standard geometries. By way of example, the typical test features "circle diameter" and "position of the center of the circle" for a generic circular measurement element are stored in the database, wherein the circle diameter is contained as an indefinite, variable parameter value. Preferably, there are also stored in the database those control commands with which the measuring head of the coordinate measuring machine has to be controlled in order to determine all measurement point coordinates that are required to quantify the respective typical test feature. If the operator then selects a first individual geometric element on a specific measurement object on the basis of the image representation of said specific measurement object, a measurement element of identical type is firstly sought in the database. Afterward, the operator is offered precisely those test features for further selection which match the selected geometric element by virtue of the fact that the selected geometric element is assigned to a measurement element of identical type in the database and those test features are offered which are assigned to the measurement element of identical type in the database. In the database, at least one typical test feature is assigned to each predefined measurement element from the plurality of predefined measurement elements, such that at least one eligible test feature is displayed when the operator selects an individual geometric element in the image representation, with respect to which the database contains a measurement element with a defined standard geometry of identical type.

The novel method and the corresponding device have the advantage that the operator is offered in a defined manner those test features which make sense for the individual measurement object and the coordinate measuring machine used and/or the measuring head used. With the selection of a test feature which is offered and is thus suitable for the individual measurement object, the operator can transfer the quantification of said eligible test feature into the defined measurement sequence very rapidly and simply. In particular, the operator can generate an individual measurement sequence for an individual measurement object without having to take a prior decision previously from a plurality of generic test features. Instead, with the aid of the database, an automatic preselection is effected and the operator is offered those test features which are meaningful and suitable for the previously selected geometric element and the measuring head used.

After the selection of the individually eligible test features, a defined measurement sequence is generated for the individual measurement object depending on the selected test features, preferably automatically by the evaluation and control unit of that coordinate measuring machine on which the measurement is carried out. This step includes determining, on the basis of the database, all measurement points and all required machine movements to record, with the aid of the available measuring head, exactly those measured values from which it is possible to determine a numerical value for the selected test feature.

Preferably, the database contains, with respect to each predefined generic measurement element, exactly those generic control commands which can be used to record the required measurement points for the quantification of the assigned typical test feature. With the selection of an offered test feature, the evaluation and control unit configures the generic control commands using the database in order thus to obtain individual control commands for measuring the selected geometric element. The configuration, which represents a measuring strategy, may include for example the determination of the length of that path section which has to be travelled by the measuring head relative to the measurement object in one or more defined directions and/or the speed and/or trajectory with which this takes place. For an optical measuring head having a camera, the configuration may further include the individual setting of the optimum working distance with respect to the measurement object.

With the novel method and the novel device the operator obtains an individual measurement sequence which can optimally take account of the properties and possible travel paths of the measuring head relative to the workpiece receptacle in relation to the specific measurement object. The operator can generate very simply and efficiently a measurement sequence that is optimally adapted to the properties of the measuring head and the geometric element to be measured. Consequently, even without profound knowledge and experience with the specific measuring machine, the operator can achieve a high measurement accuracy in conjunction with a fast measurement sequence.

In a preferred refinement of the invention, the database further contains a plurality of predefined linkage elements, wherein each predefined linkage element represents a defined property in relation to at least two of the predefined measurement elements.

In this refinement, the database contains not only typical test features with respect to individual predefined measurement elements, but also predefined relationships between such measurement elements. By way of example, a predefined linkage element may represent a point of symmetry between two measurement elements of identical type. A further advantageous linkage element may be the distance between two measurement elements. The refinement simplifies complex measurements on complex measurement objects. In preferred exemplary embodiments, the operator is offered not only individual test features with respect to a selected individual geometric element, but also suitable and meaningful linkage elements which relate to a plurality of geometric elements as soon as the operator has selected at least two geometric elements in the image representation of the measurement object.

In a further refinement, therefore, the second geometric element is furthermore selected on the basis of the image representation, and eligible linkage elements for the selected first and second geometric elements are displayed on the basis of the database.

In this refinement, the operator is offered eligible linkage elements for automatically generating a defined measurement sequence as soon as at least two geometric elements have been selected in the image representation of the measurement object. Preferably, the display of eligible test features and the display of eligible linkage elements are carried out simultaneously, such that by selecting test features and linkage elements in a representation the operator arrives very rapidly and conveniently at a complex measurement sequence in which all required measurement points are measured only once and double measurements are avoided.

In a further refinement, the eligible test features (and preferably also the eligible linkage elements) for the selected first (and preferably also for the selected second) geometric element are graphically displayed in the image representation. Preferably, the selected test features and/or selected linkage elements are also graphically displayed in the image representation.

This refinement offers a very good overview of the geometric elements that are generally present and have already been selected, and of the test features and/or linkage elements that are suitable and, if appropriate, have already been selected. This refinement thus simplifies the generation of an optimum measurement sequence and helps to avoid errors resulting in disadvantageous corrections. In some exemplary embodiments, test features and/or linkage elements are displayed as a dimensioning arrow or in a small flag containing a collection of a plurality of indications. Color differentiation advantageously makes it clear to the operator which test features have already been selected and which are still offered for selection.

In a further refinement, the numerical value with respect to the selected test feature (and/or linkage element), which numerical value was determined according to the novel method and by means of the novel device, is displayed in the image representation by the evaluation and control unit. Preferably, the evaluation and control unit blends the respective numerical value with respect to each selected test feature and/or linkage element.

In this refinement, a technical drawing of the measurement object is simulated in some way with the aid of the image representation and the numerical values obtained for the previously selected test features and/or linkage elements. This refinement has the advantage that the operator finally obtains a corresponding "actual" representation besides the "setpoint" (that is to say the technical drawing with dimensioning). In the preferred exemplary embodiments, the "actual" representation appears like the setpoint representation, in principle, but contains the "measured" numerical values determined on the basis of the measurement and, in some exemplary embodiments, color identifications in order to indicate the deviations between the technical drawing or the CAD data and the measured values.

In a further refinement, the step of selecting the first geometric element and/or the at least one displayed eligible test feature comprises a selection in the image representation of the measurement object. In some preferred variants, the device comprises an image display appliance having a touchscreen, on which the operator can directly select displayed geometric elements and/or test features and/or linkage elements by touch. Alternatively or in addition, the selection in the image representation may be effected using a mouse pointer and/or via a PC keyboard. In some preferred exemplary embodiments, the measurement sequence is generated by the operator solely by selecting geometric elements and test features and/or linkage elements. This is advantageously effected without the operator having to select geometric elements, test features and/or linkage elements in a menu structure, i.e. exclusively by direct selection in the image representation.

This refinement enables a particularly simple and intuitive selection of geometric elements, offered test features and/or linkage elements by the operator. The joint representation of selected geometric elements and eligible test features and/or linkage elements and the selection in the image representation effectively prevent unnecessary multiple measurements owing to an unfavorable measurement sequence. Accordingly, this refinement contributes very advantageously to short configuration and measurement times.

In a further refinement, the (specific) measurement object is scanned with the aid of the measuring head in order to provide the image representation. The device advantageously has a measuring head having a camera that is able to record and provide a 2D image of the measurement object. In principle, however, the image representation of the measurement object may also be generated by means of a tactile measuring head and/or, for instance, with the aid of an X-ray recording.

This refinement enables a particularly simple and rapid measurement of "unknown" measurement objects for which no CAD data are available. Furthermore, this refinement has the advantage that a measurement sequence is generated on the basis of the specific measurement object, such that possible deviations from CAD data provided are taken into account at an early stage and, in particular, collisions between the measuring head and the measurement object can be avoided.

In a further refinement, the image representation of the measurement object is generated on the basis of CAD data.

This refinement is particularly advantageous in order to simply and rapidly check the correspondence between an industrially produced series product and the specifications for said series product. Moreover, this refinement makes it possible to generate the measurement sequence for an automated measurement even at a point in time in which the measurement object is not yet available.

In a further refinement, the steps of selecting are repeated for a multiplicity of geometric elements from the plurality of geometric elements and/or for a multiplicity of displayed eligible test features, and the defined measurement sequence is automatically generated depending on all selection steps.

Advantageously, in this refinement, the entire measurement sequence is generated with the aid of the novel method and the corresponding device. As an alternative thereto, in other refinement it is possible to select only individual geometric elements, test features and/or linkage elements with the aid of the novel method and the corresponding device. By comparison therewith, however, the preferred refinement enables a particularly simple and rapid measurement, without the operator of the device having to have extensive detailed knowledge and experience concerning the device.

In a further refinement, a selection tool is provided, and eligible test features (and preferably also eligible linkage elements) are respectively displayed temporarily while the selection tool is positioned in a vicinity of the first geometric element.

This refinement includes a temporary preview of eligible test features and/or linkage elements as soon as the selection tool is situated in the vicinity of corresponding geometric elements. It is only by means of the deliberate selection of a displayed test feature and/or linkage element that the latter is accepted into the defined measurement sequence. The refinement makes it possible to measure complex measurement objects particularly simply and rapidly, without the operator having to have profound knowledge and experience in metrology.

In a further refinement, the geometric elements of the measurement object are automatically identified on the basis of the database and assigned to the predefined measurement elements in order to display the eligible test features.

This refinement, too, advantageously contributes to the fact that the operator of a coordinate measuring machine, without profound experience with the machine, can very rapidly and simply create a technically optimum measurement sequence and carry out the corresponding measurement. The determination of dimensional properties of a measurement object is thus possible particularly simply and rapidly.

It goes without saying that the abovementioned features and those yet to be explained below can be used not only in the combination specified in each case but also in other combinations or on their own, without departing from the scope of the present invention.

BRIEF DESCRIPTION OF THE DRAWINGS

Exemplary embodiments of the invention are shown in the drawing and will be explained in greater detail in the following description. In the drawings.

DESCRIPTION OF PREFERRED EMBODIMENTS

Figure 1:
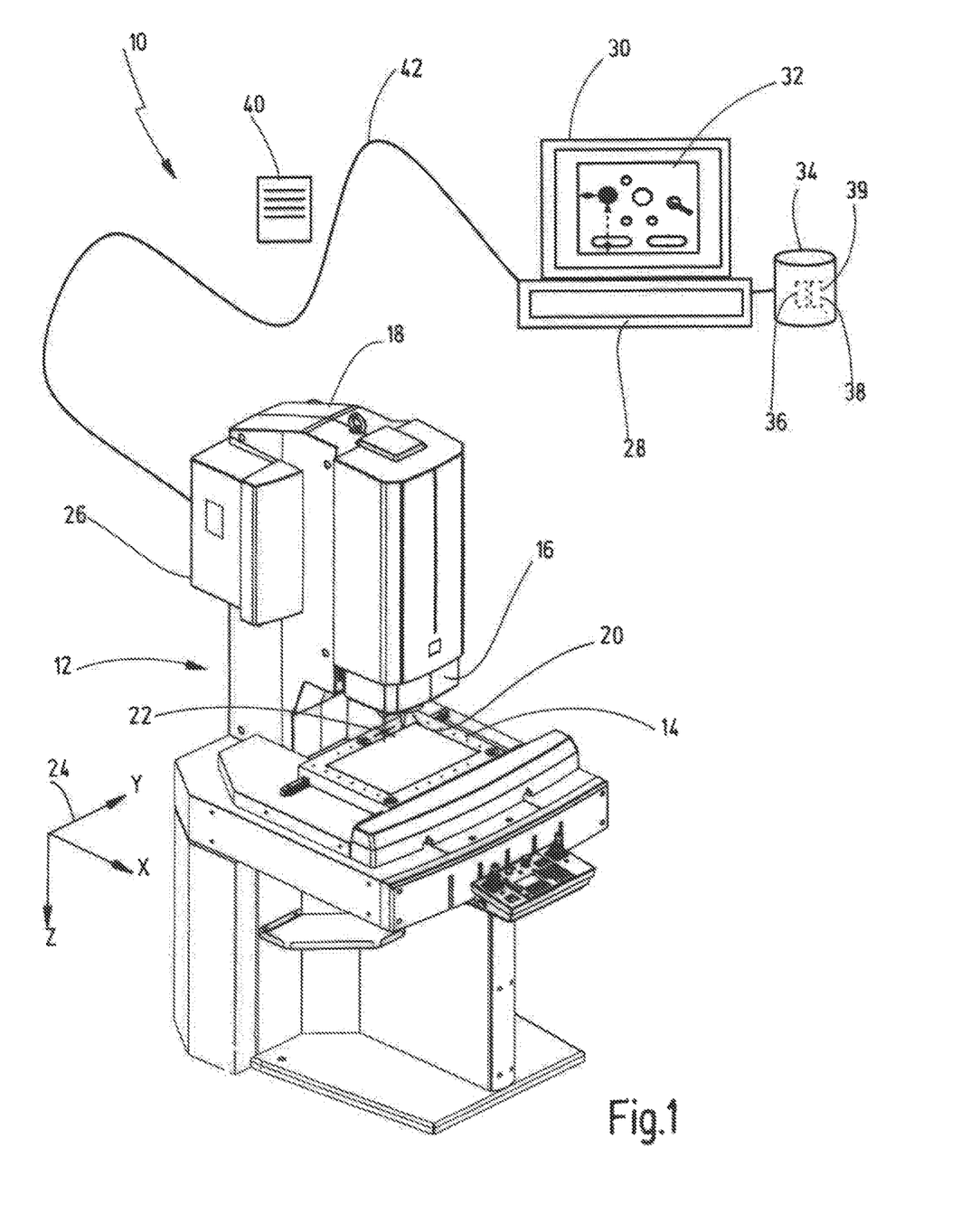
FIG. 1 shows an exemplary embodiment of the novel device, which can also be used to perform the novel method.

In FIG. 1, a device which operates according to the novel method is designated by reference numeral 10 in its entirety.

The device 10 comprises a coordinate measuring machine 12 having a workpiece receptacle 14 (here in the form of an x-y cross table) and a measuring head 16. The measuring head 16 is arranged on a column 18 and can be moved here relative to workpiece receptacle 14 in a vertical direction along column 18. This axis of movement is usually referred to as the z-axis. The workpiece receptacle 14 can be moved relative to measuring head 16 in two orthogonal directions, which are usually referred to as x- and y-axes. Overall, the measuring head 16 here can thus be moved in three orthogonal spatial directions relative to the workpiece receptacle 14 in order to carry out a measurement on a measurement object (not illustrated here). The three orthogonal spatial directions x, y, z here span a machine coordinate system, which in some exemplary embodiments serves as a reference coordinate system for the measurement point coordinates.

The prior art discloses other designs for coordinate measuring machines, for example coordinate measuring machines of gantry or bridge design. The novel device and the novel method are not restricted to a specific design of the axes of movement, and so instead of the coordinate measuring machine 12 it is also possible to use a coordinate measuring machine in which the movement of the measuring head 16 relative to the workpiece receptacle 14 is realized in some other way. In principle, the movement of the measuring head 16 relative to the workpiece receptacle 14 can be restricted to fewer than three axes of movement or the measuring head 16 and/or the workpiece receptacle 14 could have further axes of movement, such as axes of rotation, for instance.

In this exemplary embodiment, the measuring head 16 has an optical sensor 20, by means of which a measurement object (not illustrated here) can be measured in a non-contact manner. In some exemplary embodiments, the optical sensor 20 comprises a camera and a lens in order to record an image of the measurement object. Furthermore, the coordinate measuring machine 12 in this exemplary embodiment also has a tactile sensor 22, which can be used to touch measurement points on a measurement object in order to carry out a measurement.

The coordinate measuring machine 12 here exhibits a preferred exemplary embodiment for the novel device and the novel method. In other exemplary embodiments, the device may comprise a different measuring head, for instance only a tactile measuring head or only an optical measuring head. In principle, measuring head 16 could also comprise a capacitively measuring sensor or be for example a measuring head that operates according to the X-ray principle. In all preferred exemplary embodiments, the measuring head supplies measured values representing the position of at least one measurement point on the measurement object relative to a coordinate measuring system 24.

The coordinate measuring machine 12 has a control unit 26, with the aid of which the drives (not illustrated here) for the workpiece receptacle 14 and the measuring head 16 are driven in order to carry out a measurement. Furthermore, the control unit 26 takes up the measured values of the measuring head 16 and makes them available for further evaluation by an evaluation unit 28. In the exemplary embodiment illustrated, the evaluation unit 28 is a PC on which configuration and evaluation software is executed. The configuration and evaluation software makes it possible, on the one hand, to generate a measurement sequence for carrying out an automated measurement on a measurement object. On the other hand, the evaluation software makes the quantified measurement results available to an operator in a suitable manner.

The evaluation unit 28 here comprises an image display appliance, on which, inter alia, an image representation 32 of the measurement object can be displayed. In some preferred exemplary embodiments, the image representation 32 is generated with the aid of the camera of the sensor 20, that is to say that the image representation is a 2D camera image of the object to be measured. In other exemplary embodiments, the image representation 32 may be generated on the basis of CAD data of a measurement object, wherein the CAD data are fed to the evaluation unit 28 in a manner known per se. In further exemplary embodiments, it is conceivable for the device 10 to comprise a specific camera in order to generate the image representation 32 of the measurement object, or the image representation is generated separately from the device 10 and fed to the evaluation unit 28 as an image file.

The device 10 has a database 34, in which a plurality of predefined measurement elements 36, a plurality of typical test features 38 and a plurality of typical linkage elements 39 with respect to the predefined measurement elements 36 are stored. Here the typical test features 38 and linkage elements 39 are respectively assigned to the predefined measurement elements 36 such that in each case typical test features and/or linkage elements can be determined with respect to a predefined measurement element on the basis of the database 34. Predefined measurement elements are, in particular, geometric elements which can be described in an abstract manner with the aid of simple mathematical formulae, such as, for example, cylinder, parallelepiped, pyramid, cone, circle, square, rectangle, triangle, straight line, etc. Typical test features for a circular measurement element are the diameter and the position of the center of the circle relative to a reference coordinate system, which may be for example the coordinate system 24 of the device 10.

In preferred exemplary embodiments, an operator can generate a defined measurement sequence 40 for measuring a measurement object with the aid of the representation 32 on the image display appliance and transmit it to control unit 26, which is indicated here by a line 42. The measurement sequence 40 represents a plurality of control commands that cause the control unit 26 to move the measuring head 16 relative to the workpiece receptacle 14 and to record individual measured values. With the aid of the measured values, the evaluation unit 28 quantifies selected test features for the individual measurement object.

Figure 2:
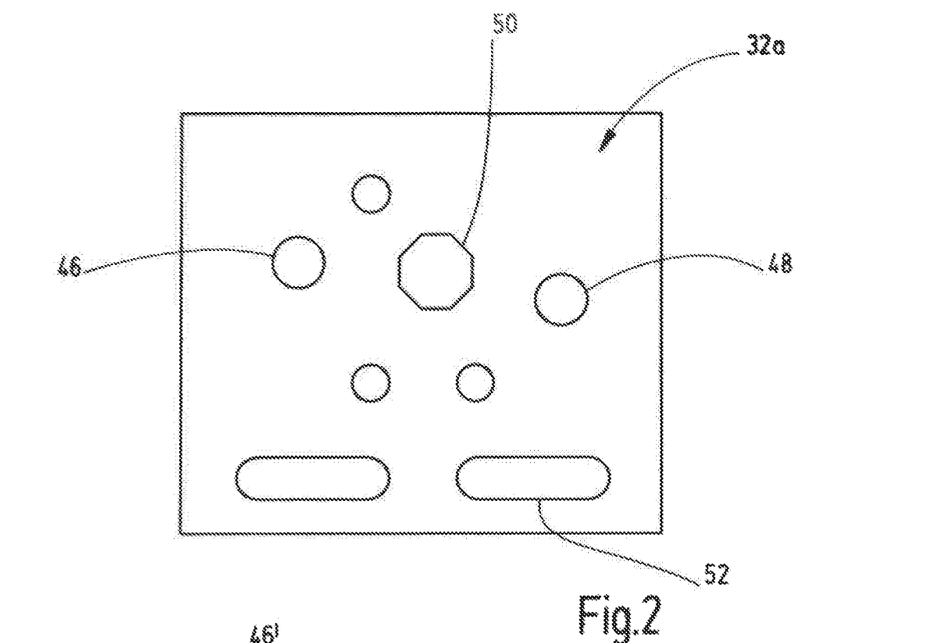
FIG. 2 shows an image representation of a measurement object for explaining the novel method.

FIG. 2 shows a simplified representation 32a of a measurement object having a plurality of geometric elements. By way of example, some geometric elements are designated here by reference numerals 46, 48, 50, 52. The geometric elements 46, 48 are cylindrical holes, for example, while the geometric element 50 is an octagonal pin that projects vertically from the observation plane. The geometric element 52 is for example an oval depression in the surface of the measurement object, which is illustrated merely schematically and by way of example here.

The representation 32a is displayed on the image display appliance 30. The operator of the device 10 can then select individual geometric elements in the manner described below in order to cause the measurement sequence 40 to be generated automatically with the aid of the evaluation unit 28.

Figure 3:
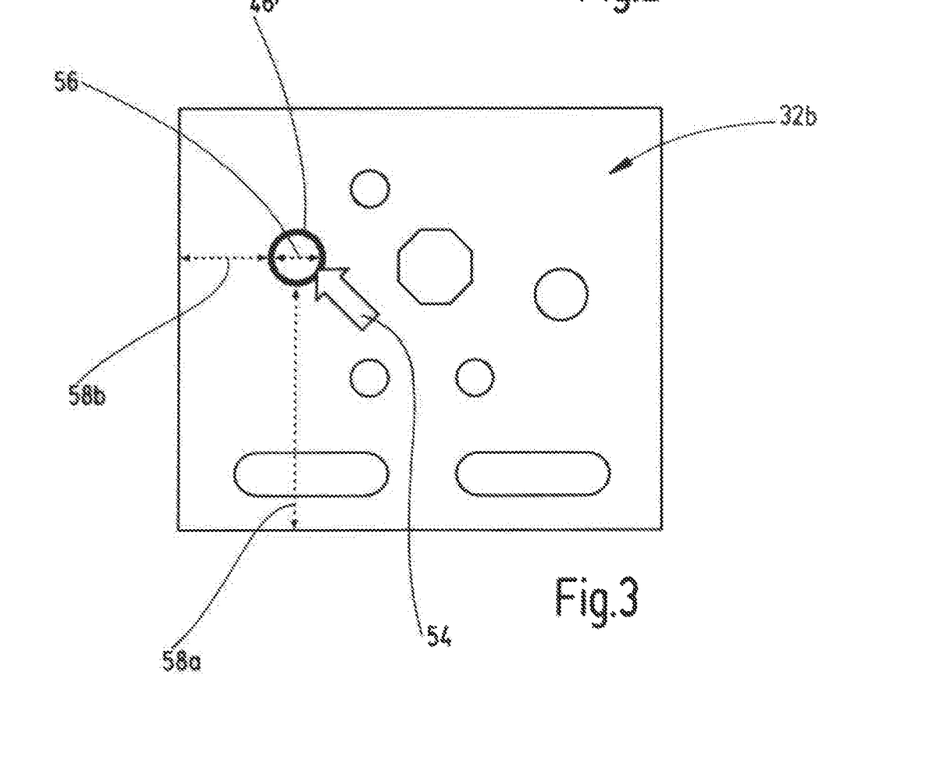
FIG. 3 shows the image representation of the measurement object from FIG. 2, wherein a first geometric element is selected.

FIG. 3 shows a representation 32b corresponding to the representation 32a from FIG. 2. However, the operator has selected the geometric element 46 in the representation 32b with the aid of a mouse pointer 54. In preferred exemplary embodiments, a selected geometric element is highlighted visually, as is illustrated on the basis of the geometric element 46' in FIG. 3. In some exemplary embodiments, the visual highlighting can be realized by a colored marking. Alternatively or in addition, in some exemplary embodiments the operator can perform a selection via a touchscreen on which the representation 32 is displayed.

In the preferred exemplary embodiments, the software of the evaluation unit 28 determines typical test features for a selected geometric element 46' with the aid of the database 34. In some exemplary embodiments, the evaluation unit 28 therefore has the ability to detect edges in the image representation 32 of a measurement object, in order to automatically identify geometric elements of the measurement object. Afterward, the evaluation unit 28 searches in the database 34 for predefined measurement elements whose shape corresponds to the identified geometric element. As soon as the evaluation unit 28 has identified a matching predefined measurement element, it selects the assigned typical test features on the basis of the database 34 and displays them graphically in the image representation 32 for the selected geometric element 46'. In the exemplary illustration in FIG. 3, the eligible test features are the diameter 56 of the hole and also the x- and y-positions 58a, 58b of the hole relative to the coordinate system 24.

Figure 4:
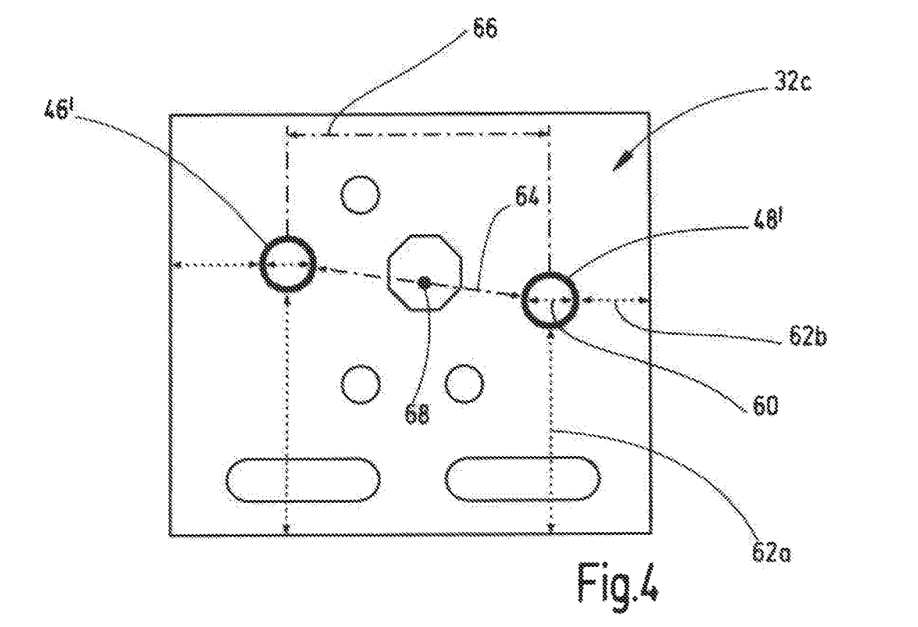
FIG. 4 shows the image representation of the measurement object from FIG. 2 with two geometric elements being selected.

FIG. 4 shows a further image representation 32c corresponding to the representation 32b from FIG. 3, but after the operator has selected a further geometric element 48'. For the further selected geometric element 48', too, the evaluation unit 28 determines eligible test features 60, 62a, and 62b with the aid of the database 34. Furthermore, in the preferred exemplary embodiments the evaluation unit 28 determines eligible linkage elements for the at least two selected geometric elements. In this exemplary embodiment, one eligible linkage element is the relative distance 64 between the two selected geometric elements 46', 48'. A further eligible linkage element here is for example the lateral offset 66 of the midpoints of the two selected geometric elements 46', 48'. A further linkage element may be the point 68 of symmetry between the two selected geometric elements 46', 48'. Generally, linkage elements are features of the object to be measured which represent a spatial relationship between two or more geometric elements on the measurement object.

Figure 5:
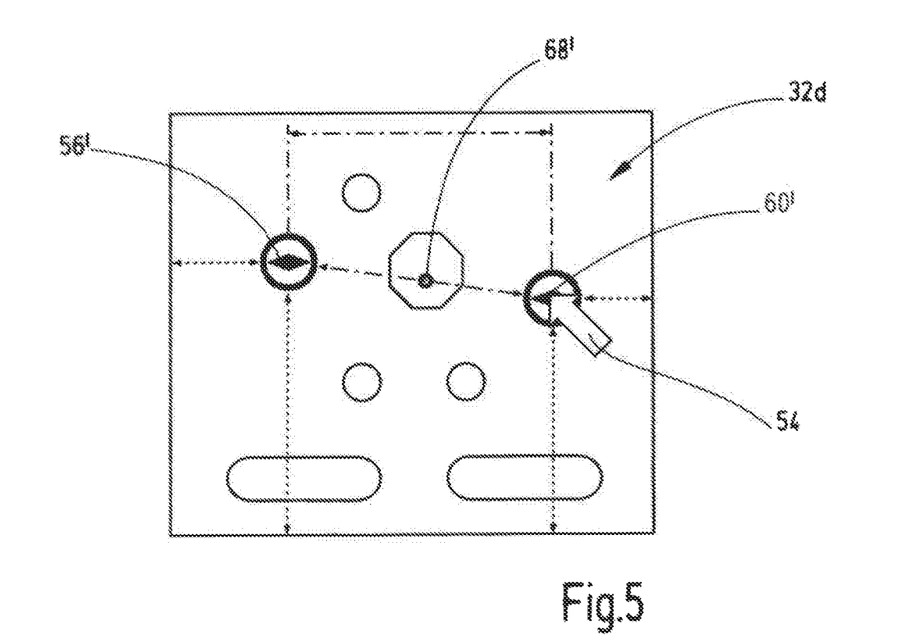
FIG. 5 shows the image representation of the measurement object from FIG. 2 with a plurality of selected test features.

In the image representation 32c in FIG. 4, two geometric elements of the measurement object are selected and the evaluation unit 28 offers eligible test features 56, 58, 60, 62 and linkage elements 64, 66, 68 with respect to the selected geometric elements 46', 48'. In contrast, FIG. 5 shows an image representation 32d in which the operator has selected the test features 56' and 60' and the offered linkage element 68' with the aid of the mouse pointer 54. In the preferred exemplary embodiments, selected test features and linkage elements are highlighted, as is indicated schematically in FIG. 5. With the selection of a test feature and/or linkage element, the evaluation unit 28 accepts the selected test feature and/or linkage element into the measurement sequence 40. By means of multiple selection, the operator can thus configure an individual measurement sequence for a measurement object.

In the preferred exemplary embodiments, the measurement sequence 40 is automatically generated after the conclusion of all selection steps by the evaluation unit 28 by virtue of the fact that the evaluation unit 28 determines the control commands for the control unit 26 on the basis of the selected test features and/or linkage elements and also on the basis of further predefined information in the database 34. Afterward, the evaluation unit 28 transmits the measurement sequence 40 to the control unit for recording the individual measured values on the selected geometric elements of the measurement object. The evaluation unit 28 subsequently reads in the recorded measured values from the control unit 26 and determines numerical values for all selected test features and/or linkage elements depending on said measured values, wherein each of said numerical values represents a dimensional property of the measurement object that corresponds to the selected test feature and/or linkage element.

Figure 6:
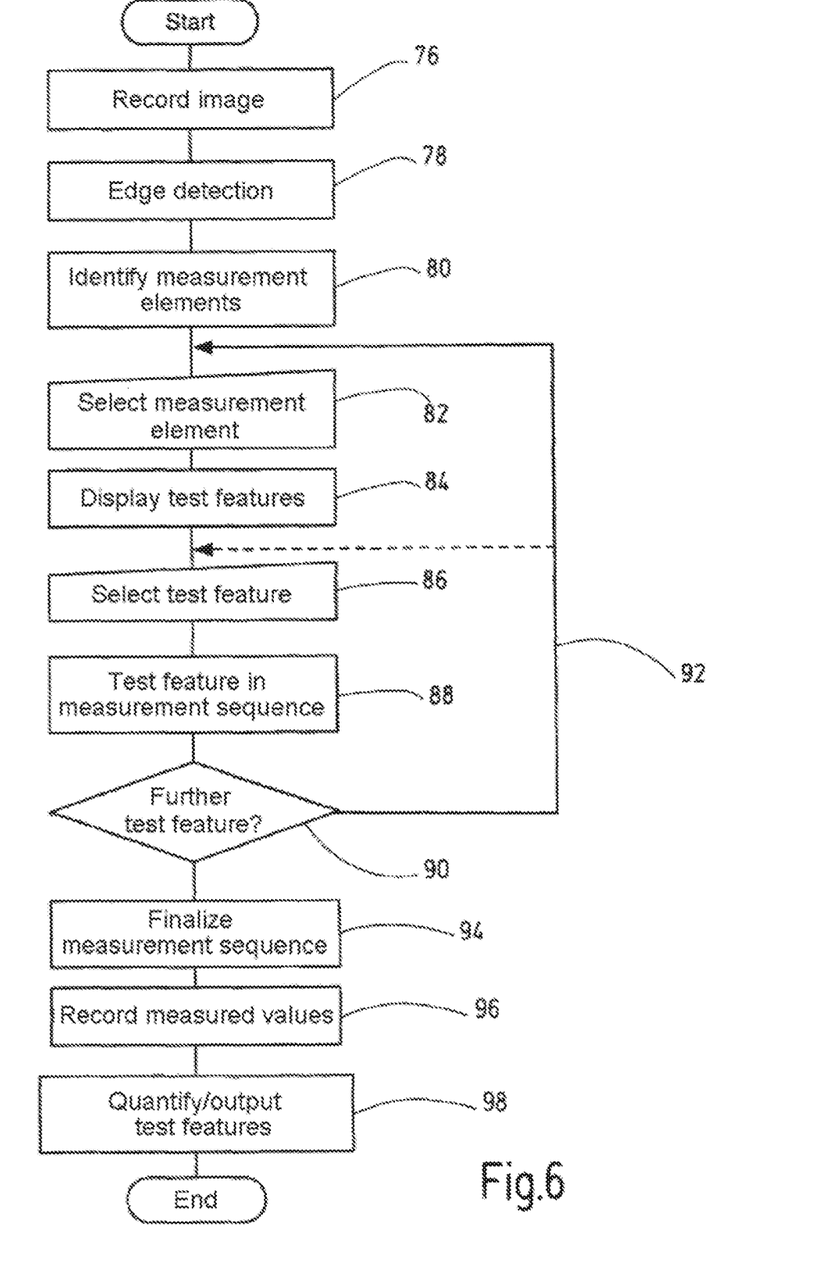
FIG. 6 shows a flow diagram for illustrating an exemplary embodiment of the novel method.

A preferred exemplary embodiment of this method is illustrated again below with reference to FIG. 6. In accordance with step 76, in this exemplary embodiment, firstly an image of the measurement object is recorded. Alternatively, the image could be generated from CAD data of the object to be measured or an image representation of the measurement object could be provided in some other way, for instance as an X-ray recording, for example as a point cloud independently of the generating sensor.

In accordance with step 78, an edge detection is subsequently carried out in order, in accordance with step 80, to identify geometric elements on the measurement object which are considered as measurement elements.

In accordance with step 82, the operator subsequently selects a geometric element in the image representation. In accordance with step 84, eligible test features for the selected geometric element are then offered to the operator, wherein the eligible test features are determined with the aid of the database 34. In accordance with step 86, the operator selects a eligible test feature, which is then accepted into the measurement sequence in accordance with step 88. Afterward, in accordance with step 90, a decision is taken as to whether further geometric elements and/or test features are intended to be selected. If this is the case, further selection steps 82, 86 can be performed in accordance with the loop 92.

After all desired test features have been selected, the measurement sequence is finalized. This comprises determining suitable control commands for the control unit 26 for recording those measured values which are required for quantifying the selected test features.

In accordance with step 96, the required measured values are subsequently recorded and, in accordance with step 98, the selected test features are quantified on the basis of the recorded measured values and output, for example on the image display appliance 30.

As already mentioned, in some exemplary embodiments the image display appliance 30 can comprise a touchscreen and geometric elements, test features and/or linkage elements can be selected by "touching" the respective elements on the touchscreen.

Overall, in all preferred exemplary embodiments logically meaningful test features and/or linkage elements, depending on previously selected geometric elements of the object to be measured, are graphically displayed directly in the image representation of the measurement object and offered for (further) selection to the operator. If the operator selects a different geometric element and/or further geometric elements, the display of the test features and/or linkage elements offered for further selection changes depending on the current selection. A multiple selection of geometric elements and/or test features and/or linkage elements is advantageously possible. It is particularly preferred if the operator creates the measurement sequence solely by selecting displayed geometric elements and test features and/or linkage elements offered for this purpose, without carrying out in the process supplementary selections and/or configurations by opening and closing menus.

What is claimed is:

1. A computer-assisted method of controlling a coordinate measuring machine for determining dimensional properties of a measurement object having a plurality of geometric elements, wherein the coordinate measuring machine includes a measuring head for recording measured values representing a position of at least one measurement point on the measurement object and a control unit configured to control the movements of the measuring head relative to the measurement object, the method comprising the following steps:

providing an evaluation unit having a display device and a database containing a plurality of predefined measurement elements and a plurality of typical test features assigned to the predefined measurement elements, wherein each typical test feature from the plurality of typical test features represents a defined dimensional property of at least one predefined measurement element, providing on said display device an image representation of the measurement object, which image representation shows at least a first and a second geometric element of the measurement object from the plurality of geometric elements, receiving via said evaluation unit first user input from the user, said first user input selecting the first geometric element in the image representation, graphically displaying on said display device eligible test features for the selected first geometric element in the image representation when the first user input is received, wherein the eligible test features are automatically determined from the plurality of typical test features by the selected first geometric element being assigned to a predefined measurement element from the plurality of predefined measurement elements, and wherein displaying the eligible test features for the selected first geometric element may vary in response to further user input, receiving via said evaluation unit second user input from the user, said second user input selecting at least one displayed eligible test feature for the first geometric element in the image representation, wherein the at least one displayed eligible test feature becomes, as a result of the selection by the second user input, a selected test feature for the first geometric element, generating via said evaluation unit a defined measurement sequence depending on the selected test feature and supplying said defined measurement sequence to said control unit, controlling the movement of said measuring head via said control unit in accordance with said defined measurement sequence, recording individual measured values on the first geometric element with the aid of the measuring head and depending on the defined measurement sequence, and determining a numerical value depending on the individual measured values, wherein the numerical value represents a dimensional property of the first geometric element which corresponds to the selected test feature.

2. The method of claim 1, wherein the database further contains a plurality of predefined linkage elements, and wherein each predefined linkage element represents a defined dimensional property in relation to at least two of the predefined measurement elements.

3. The method of claim 2, further comprising a step of receiving via said evaluation unit third user input from the user, said third user input selecting the second geometric element in the image representation, wherein eligible linkage elements for the selected first and second geometric elements are displayed on said display device on the basis of the database for further selection.

4. The method of claim 3, further comprising a step of receiving via said evaluation unit fourth user input from the user, said fourth user input selecting at least one displayed eligible linkage element in the image representation, wherein the at least one displayed linkage element becomes, as a result of the selection by the fourth user input, a selected linkage element, and wherein the defined measurement sequence is generated depending on the selected linkage element.

5. The method of claim 4, wherein the steps of receiving third and fourth user input are repeated for a multiplicity of displayed eligible test features, and wherein the defined measurement sequence is automatically generated by said evaluation unit depending on all selection steps.

6. The method of claim 1, wherein the steps of receiving first and second user input are repeated for a multiplicity of first geometric elements from the plurality of geometric elements, and wherein the defined measurement sequence is automatically generated by said evaluation unit depending on all selection steps.

7. The method of claim 1, wherein the numerical value with respect to the selected test feature is displayed on said display device in the image representation.

8. The method of claim 1, wherein the measurement object is scanned with the aid of the measuring head in order to provide the image representation.

9. The method of claim 1, wherein the image representation of the measurement object is generated on the basis of CAD data provided to said database.

10. The method of claim 1, wherein said evaluation unit further includes a selection tool, and wherein eligible test features are respectively displayed on said display device temporarily while the selection tool is positioned in a vicinity of the displayed first geometric element.

11. The method of claim 1, wherein the geometric elements of the measurement object are automatically identified on the basis of the database and assigned to the predefined measurement elements in order to determine and display the eligible test features.

12. A coordinate measuring device for determining dimensional properties of a measurement object having a plurality of geometric elements, comprising:
 a workpiece receptacle for holding the measurement object,
 a measuring head movable relative to the workpiece receptacle and configured for recording measured values representing a position of at least one measurement point on the measurement object,
 an evaluation and control unit, which is configured to move the measuring head relative to the workpiece receptacle depending on a defined measurement sequence, and
 wherein the evaluation and control unit includes an image display device and a database containing a plurality of predefined measurement elements and a plurality of typical test features with respect to the predefined measurement elements,
 wherein each typical test feature from the plurality of typical test features represents a defined dimensional property of at least one predefined measurement element,
 wherein the evaluation and control unit is configured to display on said image display device an image representation of the measurement object, which image representation shows at least a first and a second geometric element of the measurement object from the plurality of geometric elements,
 wherein the evaluation and control unit further includes a first selection tool to enable user selection of the geometric elements on the basis of the image representation and user selection of test features,
 wherein the evaluation and control unit is further configured to generate a defined measurement sequence depending on the selected test features,
 wherein the first selection tool enables deliberate selection of individual geometric elements in the image representation of the measurement object by a user,
 wherein the evaluation and control unit is further configured to graphically display on said display device eligible test features for the first geometric element in the image representation of the measurement object when the user selects the first geometric element,
 wherein the evaluation and control unit determines the eligible test features depending on the selection from the plurality of typical test features in the database by virtue of the fact that said evaluation and control unit assigns the selected first geometric element to a predefined measurement element from the plurality of predefined measurement elements,
 wherein any display on said display device of the test features offered for further selection changes depending on the current selection if the operator selects a different geometric element or further geometric elements,
 wherein the evaluation and control unit further includes a second selection tool to enable selection of at least one displayed eligible test feature by the user in the image representation,
 wherein the at least one displayed eligible test feature becomes, as a result of the selection, a selected test feature, and
 wherein the evaluation and control unit is further configured, depending on the selected test feature, to record individual measured values on the first geometric element and to determine a numerical value representing a dimensional property of the first geometric element which corresponds to the selected test feature.

13. A method of controlling a coordinate measuring machine for determining dimensional properties of a measurement object having a plurality of geometric elements, wherein the coordinate measuring machine includes a measuring head for recording measured values representing a position of at least one measurement point on the measurement object and a control unit configured to control the movements of the measuring head relative to the measurement object, comprising the following steps:
 providing an evaluation unit having a display device and a database containing a plurality of predefined measurement elements and a plurality of typical test features with respect to the predefined measurement elements, wherein each typical test feature from the plurality of typical test features represents a defined dimensional property of at least one predefined measurement element,
 providing on said display device an image representation of the measurement object, which image representation shows at least a first and a second geometric element of the measurement object from the plurality of geometric elements,
 selecting via the evaluation unit the first geometric element using the image representation,
 displaying on said display device eligible test features for the selected first geometric element, wherein the eligible test features are determined from the plurality of typical test features by the selected first geometric element being assigned to a predefined measurement element from the plurality of predefined measurement elements, selecting via said evaluation unit at least one displayed eligible test feature, wherein the at least one displayed eligible test feature becomes, as a result of the selection, a selected test feature for the first geometric element, generating via said evaluation unit a defined measurement sequence depending on the selected test feature and supplying said defined measurement sequence to said control unit, controlling the movement of said measuring head via said control unit in accordance with said defined measurement sequence, recording individual measured values on the first geometric element with the aid of the measuring head and depending on the defined measurement sequence, and determining a numerical value depending on the individual measured values, wherein the numerical value represents a dimensional property of the first geometric element which corresponds to the selected test feature.

14. The method of claim 13, wherein the database further contains a plurality of predefined linkage elements, and wherein each predefined linkage element represents a defined dimensional property in relation to at least two of the predefined measurement elements.

15. The method of claim 14, wherein the second geometric element is selected via said evaluation unit using the image representation, and wherein eligible linkage elements for the selected first and second geometric elements are displayed on said display device for further selection on the basis of the database.

16. The method of claim 13, wherein the eligible test features for the selected first geometric element are graphically displayed on the display device in the image representation.

17. The method of claim 13, wherein the step of selecting the first geometric element comprises a selection in the image representation of the measurement object.

18. The method of claim 13, wherein said evaluation unit further includes a selection tool, and wherein eligible test features are respectively displayed on said display device temporarily while the selection tool is positioned in a vicinity of the displayed first geometric element.

19. The method of claim 13, wherein the geometric elements of the measurement object are automatically identified by the evaluation unit on the basis of the database and assigned to the predefined measurement elements in order to display the eligible test features.

* * * * *